US008347380B1

(12) United States Patent
Satish et al.

(10) Patent No.: US 8,347,380 B1
(45) Date of Patent: Jan. 1, 2013

(54) PROTECTING USERS FROM ACCIDENTALLY DISCLOSING PERSONAL INFORMATION IN AN INSECURE ENVIRONMENT

(75) Inventors: Sourabh Satish, Fremont, CA (US); Shreyans Mehta, Fremont, CA (US); Vijay Anand Seshadri, Milpitas, CA (US)

(73) Assignee: Symantec Corporation, Mountain View, CA (US)

( * ) Notice: Subject to any disclaimer, the term of this patent is extended or adjusted under 35 U.S.C. 154(b) by 634 days.

(21) Appl. No.: 12/217,071

(22) Filed: Jun. 30, 2008

(51) Int. Cl.
 *G06F 11/00* (2006.01)
(52) U.S. Cl. .............. 726/22; 726/1; 726/23; 708/200
(58) Field of Classification Search ............ 726/22
 See application file for complete search history.

(56) References Cited

U.S. PATENT DOCUMENTS

| | | | | | |
|---|---|---|---|---|---|
| 6,006,328 | A | * | 12/1999 | Drake | 726/23 |
| 6,111,506 | A | * | 8/2000 | Yap et al. | 340/572.1 |
| 7,058,604 | B2 | * | 6/2006 | Kurumida | 705/50 |
| 7,272,857 | B1 | * | 9/2007 | Everhart | 726/26 |
| 2002/0138351 | A1 | * | 9/2002 | Houvener et al. | 705/18 |
| 2002/0156855 | A1 | * | 10/2002 | Ueno | 709/206 |
| 2003/0172305 | A1 | * | 9/2003 | Miwa | 713/201 |
| 2004/0098285 | A1 | * | 5/2004 | Breslin et al. | 705/1 |
| 2004/0098605 | A1 | * | 5/2004 | Kasper, II | 713/200 |
| 2005/0144203 | A1 | * | 6/2005 | McCallum | 708/200 |
| 2006/0020559 | A1 | * | 1/2006 | Steinmetz | 705/67 |
| 2006/0136910 | A1 | * | 6/2006 | Brickell et al. | 718/1 |
| 2007/0089111 | A1 | * | 4/2007 | Robinson et al. | 718/1 |
| 2007/0113227 | A1 | * | 5/2007 | Oney et al. | 718/1 |
| 2007/0226484 | A1 | * | 9/2007 | Pering et al. | 713/153 |
| 2007/0250903 | A1 | * | 10/2007 | Furuichi et al. | 726/1 |
| 2007/0271610 | A1 | * | 11/2007 | Grobman | 726/22 |
| 2009/0241187 | A1 | * | 9/2009 | Troyansky | 726/22 |

OTHER PUBLICATIONS

Larry Ullman; March Liyance; "C Programming: Visual Quickstart Guide", Oct. 13, 2004, Print ISBN-10: 0-321-28763-0, Publisher: Peachpit Press; ch. 11, 11 pages.*
Larry Ullman; March Liyance; "C Programming: Visual Quickstart Guide", Oct. 13, 2004, Print ISBN-10: 0-321-28763-0, Publisher: Peachpit Press; ch.5, 10 pages.*
Heng Yin, Dawn Song, Manuel Egele, Christopher Kruegel, and Engin Kirda. 2007. Panorama: capturing system-wide information flow for malware detection and analysis. In Proceedings of the 14th ACM conference on Computer and communications security (CCS '07). ACM, New York, NY, USA.*

* cited by examiner

*Primary Examiner* — Carl Colin
*Assistant Examiner* — S. Ali Zaidi
(74) *Attorney, Agent, or Firm* — Lowenstein Sandler PC

(57) ABSTRACT

A method and system for protecting users from accidentally disclosing personal information in an insecure environment. In one embodiment, the method includes monitoring I/O device input data associated with a guest operating system on a virtualization platform. The guest operating system has less privilege than a privileged operating system on the virtualization platform. The method further includes determining whether the I/O device input data corresponds to personal information of a user, and delaying or blocking the transfer of the I/O device input data to the guest operating system if the I/O device input data corresponds to the personal information of the user.

20 Claims, 10 Drawing Sheets

PROTECTING USERS FROM ACCIDENTALLY DISCLOSING PERSONAL INFORMATION IN AN INSECURE ENVIRONMENT

FIELD OF INVENTION

Embodiments of the invention relate to the field of data security, and more particularly, to protecting users from accidentally disclosing personal information in an insecure environment.

BACKGROUND OF THE INVENTION

Computer viruses, worms, malware and rootkits that aid in theft of identity and other personal information have become as pervasive and widespread as the modern computer itself. In many instances, they can infect or subvert protective measures in the user's operating system (OS). This intrusive software may also chain itself into the I/O handlers of the OS and quietly monitor I/O traffic without any apparent side effects to the user. This can potentially lead to leakage of users' personal information.

Modern computer systems typically run some variation of anti-virus or security software to thwart against the threat of personal information theft. These security software suits run either at the same privilege level as the OS or at a lower privilege level than the OS. If a virus or malware has already succeeded in infecting the OS and its applications, it can subvert security measures implemented at the same privilege level. Therefore, security software running at the same privilege level as the OS and other applications in the system may not provide adequate protection of the user's personal information.

Virtualization allows multiplexing of the underlying physical machine between different virtual machines, each running its own operating system. The software layer providing the virtualization is commonly referred to as a hypervisor and is also known as a virtual machine monitor (VMM) or a host. A hypervisor has control of hardware resources on the virtualization platform and is assigned a higher privilege level than that of the guest operating systems. As a result, a hypervisor is often used to improve security of the virtualization platform.

One conventional security mechanism uses a hypervisor to prevent leakage of user personal information via guest software. Such leakage can occur, for example, when a guest OS is infected or a guest browser has malicious components monitoring user input of personal information. The above security mechanism allows a user to refrain from entering personal information when interacting with the guest software, but rather enter personal information via a secure means provided by the hypervisor. However, this mechanism has proved to be inefficient because users often accidentally disclose their personal information to the guest software due to forgetfulness or carelessness.

SUMMARY OF THE INVENTION

A method and system for protecting users from accidentally disclosing personal information in an insecure environment. In one embodiment, the method includes monitoring I/O device input data associated with a guest operating system on a virtualization platform. The guest operating system has less privilege than a privileged operating system on the virtualization platform. The method further includes determining whether the I/O device input data corresponds to personal information of a user, and delaying or blocking the transfer of the I/O device input data to the guest operating system if the I/O device input data corresponds to the personal information of the user.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
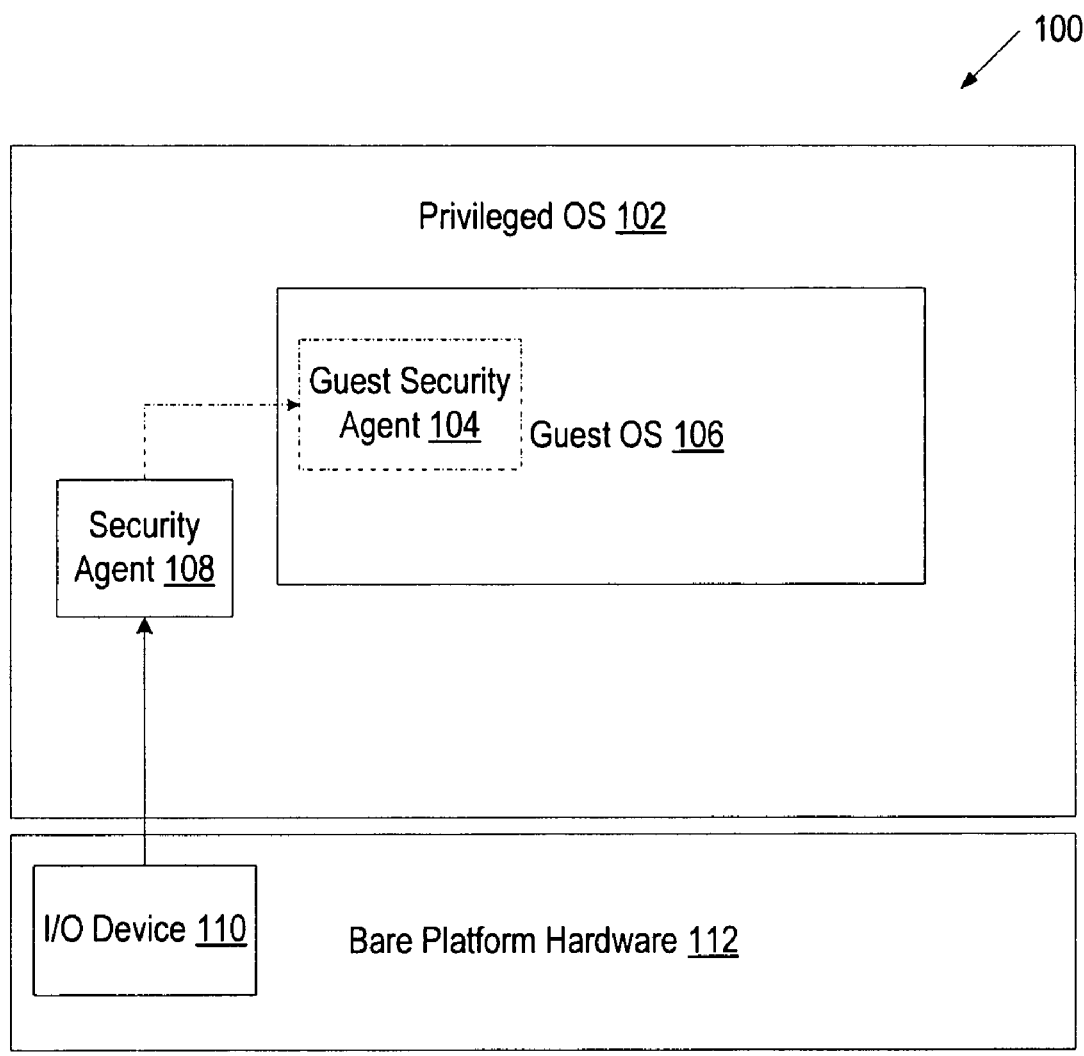
FIGS. 1 through 3 illustrate exemplary virtual machine environments in which embodiments of the invention can operate.

A method and system for protecting users from accidentally disclosing personal information in an insecure environment is disclosed. Examples of personal information may include account user names and passwords, credit card numbers, social security numbers, account numbers, employee numbers, driver license numbers, license plate numbers, etc. In one embodiment, a security agent of a privileged operating system (OS) monitors I/O device input data associated with a guest OS. The privileged OS and the guest OS run on the virtualization platform, and guest OS has less privilege than the privileged OS. As will be discussed in greater detail below, the security agent compares the I/O device input data associated with the guest OS to determine whether the I/O device input data corresponds to personal information of a user. If the I/O device input data corresponds to the personal information of the user, the security agent causes the transfer of the I/O input data to the guest OS to be delayed and/or blocked. If the I/O device input data does not correspond to the personal information of the user, the security agent causes the I/O input data to be transferred to the guest OS.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
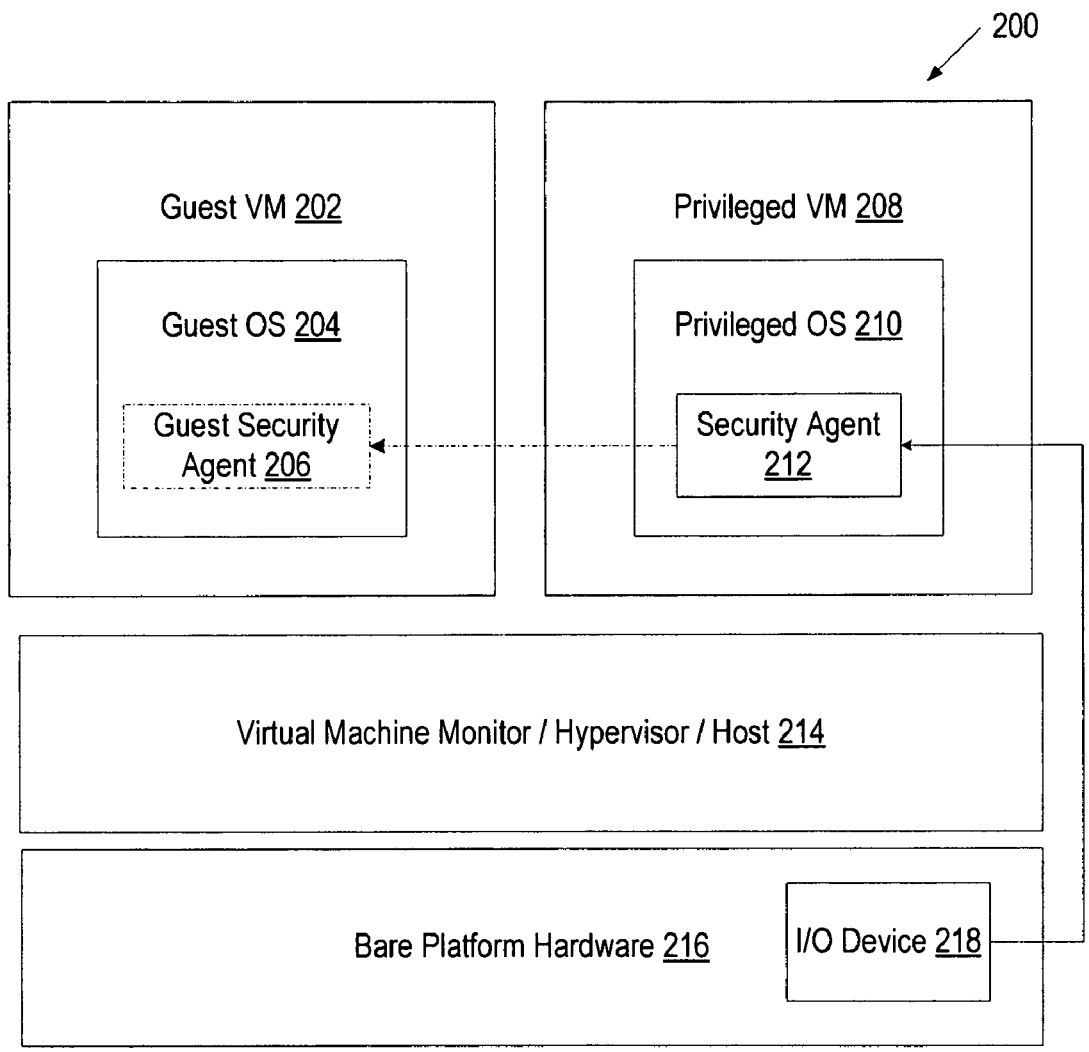
Figure 3:
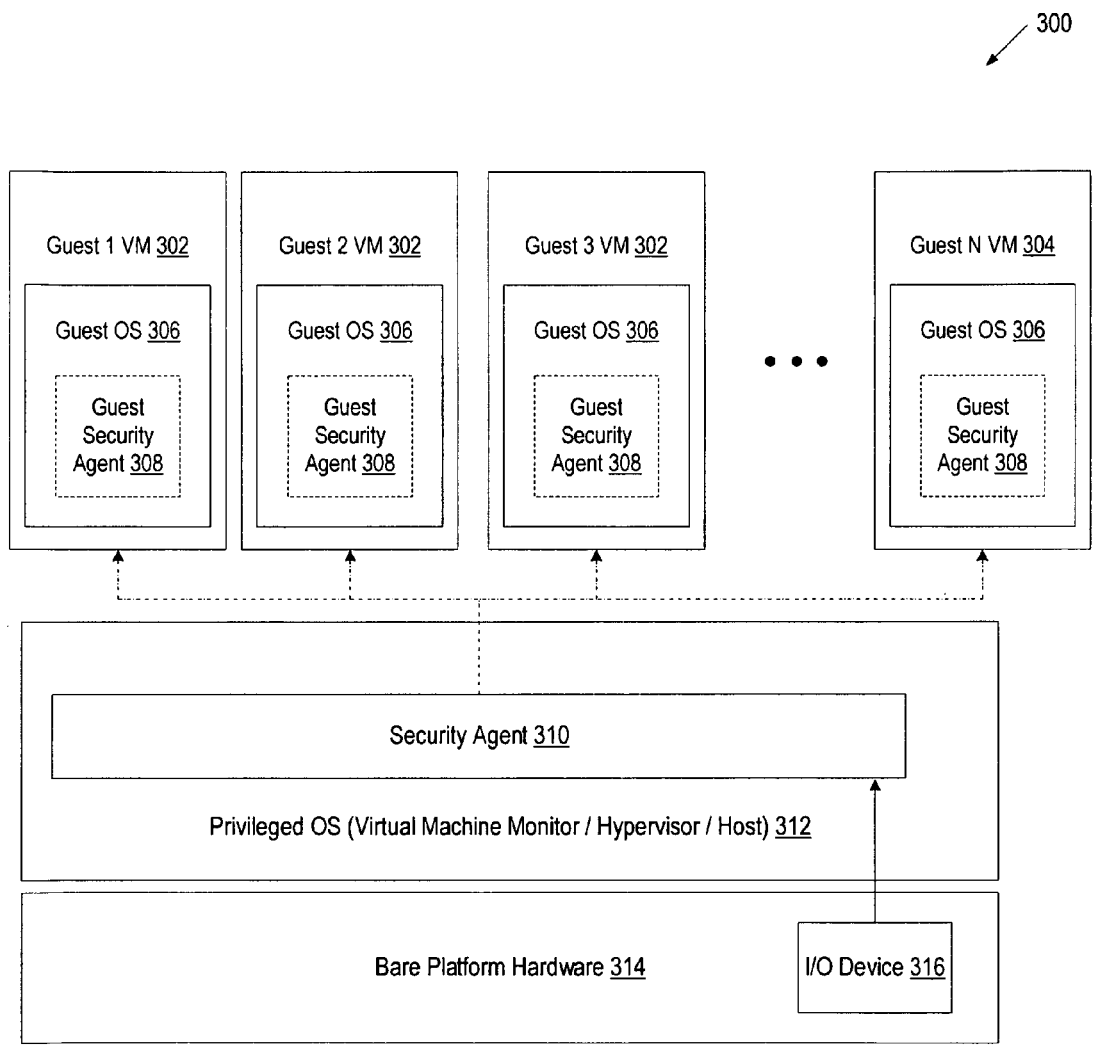

Embodiments of the invention are directed to protecting users from accidentally disclosing personal information in an insecure environment. Embodiments of the invention can operate in various virtual machine environments. FIGS. 1, 2 and 3 illustrate examples of such virtual machine environments.

Referring to FIG. 1, a virtual machine environment 100 includes bare platform hardware 112 representing a virtualization platform that is capable of executing a host operating system (OS) 102 and a guest OS 106. The platform hardware 112 can be of a personal computer (PC), mainframe, handheld device, portable computer, set-top box, or any other computing system. The platform hardware 112 can include a processor, memory, input/output (I/O) devices including an I/O device 110, etc. An I/O device 110 can be, for example, a keyboard, a cursor control device, a display device, etc.

The host OS 102 and the guest OS 106 execute at different privilege levels, and can be different operating systems, different versions of the same operating system, or different instances of the same operating system version. For example, the host OS 102 can be a Windows® OS and the guest OS 106 can be a Linux OS, or the host OS 102 and the guest OS 106 can both be a Linux OS. The host OS 102 is referred to herein as a privileged OS because it executes at a privilege level higher than that of the guest OS 106. The privileged OS 102 has control of the hardware resources of the platform 112, including the I/O device 110.

The privileged OS 102 provides a secure environment as opposed to the guest OS 106 which is significantly more susceptible to attack due to vulnerabilities in the guest operating system and guest applications. In particular, it is not unlikely for the guest OS 106 or any of its applications to become infected with a virus or malware intended to harvest user personal information. For example, a web browser (not shown) running on the guest OS 106 may have malicious components that can monitor the user's personal information being entered by the user in the guest OS 106 via the I/O device 110 (e.g., a keyboard).

As discussed above, the privileged OS 102 has control over the I/O device 110 and can monitor data entered by the user via the I/O device 110. In one embodiment, the privileged OS 102 has a security agent 108 that monitors I/O device input data being associated with the guest OS 106 (e.g., input data being sent to a guest application such as a guest web browser), and determines whether the I/O input data corresponds to personal information of the user. The personal information may include, for example, account user names and passwords, credit card numbers, social security numbers, account numbers, employee numbers, driver license numbers, license plate numbers, etc. If the security agent 108 determines that the I/O input data corresponds to the personal information of the user, the security agent 108 can cause the transfer of the I/O input data to the guest OS 108 to be delayed or blocked. Otherwise, if the security agent 108 determines that the I/O input data does not correspond to the personal information of the user, the security agent 108 can cause the I/O input data to be transferred to the guest OS 106.

The security agent 108 can be a component of the privileged OS 102, a plugin of the privileged OS 102, or a separate module within the privileged OS layer with the same privilege level as the privileged OS 102. In one embodiment, the security agent 108 interacts with a security agent 104 of the guest OS 106 to provide alerts regarding the disclosure of personal information to the user. The guest security agent 104 can be a component of the guest OS 106, a plugin of the guest OS 106, or a separate module running on the guest OS 106. In another embodiment, the security agent 108 provides alerts to the user in the privileged OS environment, without a need for a guest security agent.

Referring to FIG. 2, a virtual machine environment 200 includes bare platform hardware 216 representing a virtualization platform that is capable of executing a virtual machine monitor (VMM) 214. The platform hardware 216 can be of a personal computer (PC), mainframe, handheld device, portable computer, set-top box, or any other computing system. The platform hardware 216 can include a processor, memory, input/output (I/O) devices including an I/O device 218, etc. An I/O device 218 can be, for example, a keyboard, a cursor control device, a display device, etc.

The VMM (also known as a hypervisor) 214, though typically implemented in software, may emulate and export a bare machine interface to higher level software. Such higher level software may comprise a standard or real-time OS, may be a highly stripped down operating environment with limited operating system functionality, may not include traditional OS facilities, etc. Alternatively, for example, the VMM 214 may be run within, or on top of, another VMM. VMMs may be implemented, for example, in hardware, software, firmware or by a combination of various techniques.

The VMM 214 presents to other software (i.e., "guest" software) the abstraction of one or more virtual machines (VMs), which may provide the same or different abstractions to the various guests. FIG. 2 shows two VMs, 202 and 208, with guest OSes 204 and 210 respectively.

The guest OS 204 and the guest OS 210 have different privileges, and can be different operating systems, different versions of the same operating system, or different instances of the same operating system version. The guest OS 210 also known as a service OS, protected OS or management OS has more privilege than the guest OS 204, and is, therefore, referred to herein as a privileged OS. The privileged OS 210 has control of some (e.g., selective) hardware resources of the platform 216, including the I/O device 218.

The privileged OS 210 provides a secure environment as opposed to the guest OS 204 which is significantly more susceptible to attack due to vulnerabilities in the guest operating system and guest applications. In one embodiment, the privileged OS 210 has a security agent 212 that monitors I/O device input data associated with the guest OS 204 (e.g., input data being sent to a guest application such as a guest web browser), and determines whether the I/O input data corresponds to personal information of the user. If the security agent 212 determines that the I/O input data corresponds to the personal information of the user, the security agent 212 can cause the transfer of the I/O input data to the guest OS 204 to be delayed or blocked. Otherwise, if the security agent 212 determines that the I/O input data does not correspond to the personal information of the user, the security agent 212 can cause the I/O input data to be transferred to the guest OS 204.

The security agent 212 can be a component of the privileged OS 210, a plugin of the privileged OS 210, or a separate module within the privileged OS layer with the same privilege level as the privileged OS 210. In one embodiment, the security agent 212 interacts with a security agent 206 of the guest OS 204 to provide alerts regarding the disclosure of personal information to the user. The guest security agent 206 can be a component of the guest OS 204, a plugin of the guest OS 204, or a separate module running on the guest OS 204. In another embodiment, the security agent 212 provides alerts to the user in the privileged OS environment, without a need for a guest security agent.

Referring to FIG. 3, a virtual machine environment 300 includes bare platform hardware 314 representing a virtualization platform that is capable of executing a VMM (also known as a hypervisor or host) 312. The platform hardware 314 can be of a personal computer (PC), mainframe, handheld device, portable computer, set-top box, or any other computing system. The platform hardware 314 can include a processor, memory, input/output (I/O) devices including an I/O device 316, etc. An I/O device 316 can be, for example, a keyboard, a cursor control device, a display device, etc.

The VMM 312 presents to other software (i.e., "guest" software) the abstraction of virtual machines (VMs), which may provide the same or different abstractions to the various guests. FIG. 3 shows multiple VMs 302 with guest OSes 306. The guest OSes 306 can be different operating systems, different versions of the same operating system, or different instances of the same operating system version.

In the virtual environment 300, the VMM 312 assumes the role of a privileged OS because it has a higher privilege level than the guest OSes 306. The VMM 312 has control of the hardware resources of the platform 314, including the I/O device 316.

The VMM or privileged OS 312 provides a secure environment as opposed to the guest OSes 302 which are significantly more susceptible to attack due to vulnerabilities in the guest operating systems and guest applications. In one embodiment, the privileged OS 312 has a security agent 310 that monitors I/O device input data being associated with guest OS 306 (e.g., input data being sent to guest applications such as guest web browsers), and determines whether the I/O input data corresponds to personal information of a user. If the security agent 310 determines that the I/O input data corresponds to the personal information of the user, the security agent 310 can cause the transfer of the I/O input data to a relevant guest OS 306 to be delayed or blocked. Otherwise, if the security agent 310 determines that the I/O input data does not correspond to the personal information of the user, the security agent 310 can cause the I/O input data to be transferred to the relevant guest OS 306.

The security agent 310 can be a component of the privileged OS 312, a plugin of the privileged OS 312, or a separate module within the privileged OS layer with the same privilege level as the privileged OS 312. In one embodiment, the security agent 310 interacts with security agents 308 of guest OSes 306 to provide alerts regarding the disclosure of personal information to the user. Each guest security agent 308 can be a component of a relevant guest OS 306, a plugin of a relevant guest OS 306, or a separate module running on a relevant guest OS 306. In another embodiment, the security agent 310 provides alerts to the user in the privileged OS environment, without a need for a guest security agent.

Figure 4:
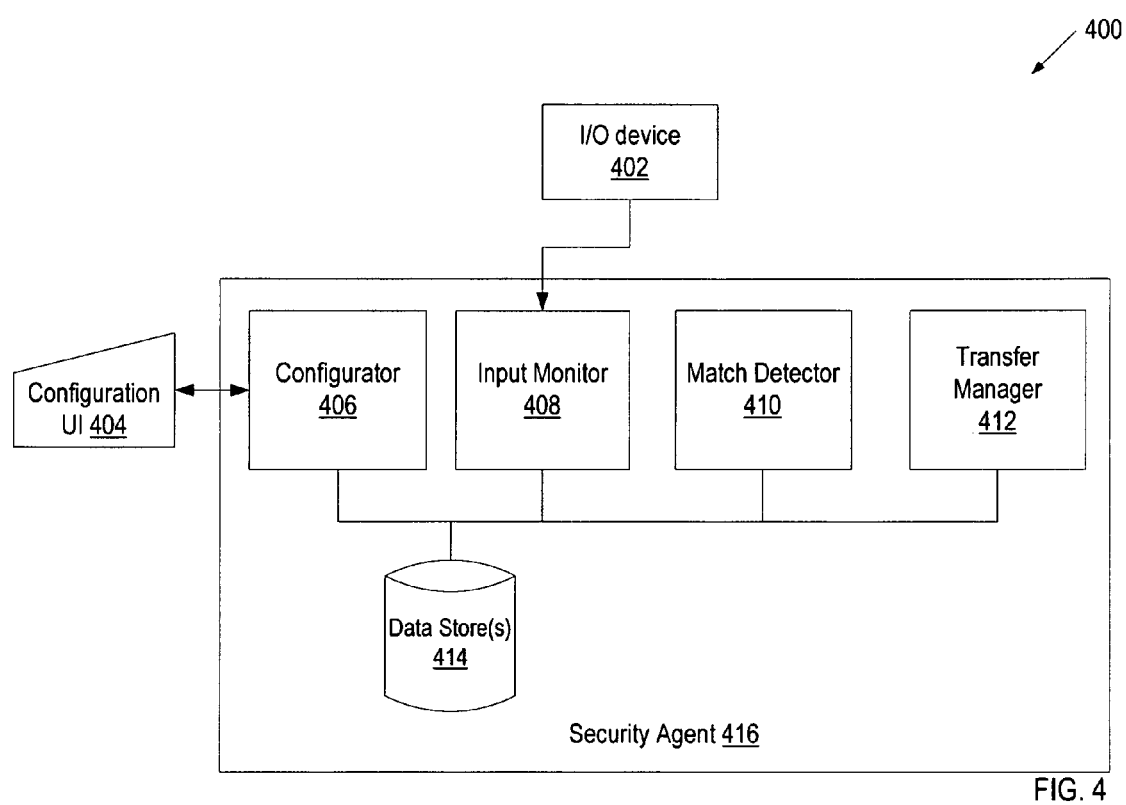
FIG. 4 is a block diagram of one embodiment of a security agent associated with a privileged operating system on a virtualization platform.

FIG. 4 is a block diagram of one embodiment of a security agent 416 associated with a privileged operating system on a virtualization platform. The security agent 416 may include a configurator 406, an input monitor 408, a match detector 410, a transfer manager 412, one or more data stores 414, and/or any other components.

The configurator 406 is responsible for configuring the security agent 416. In one embodiment, the configurator 406 provides a user interface (UI) 404 that allows a user to specify configuration properties of the security agent 416. For example, the user can use the UI 404 to enter a list of personal information items for use by the security agent 416. Personal information items may include, for example, a social security number (SSN), employee number, credit card numbers, user IDs and passwords for use with different accounts and/or websites, etc. In an alternative embodiment, the user can request via the UI 404 that personal information items be imported from modules in the guest OS that hold user personal information like a password manager or a form filler component. In addition, or alternatively, the user can request via the UI 404, that personal information items be downloaded from a secure, remotely hosted service, upon authentication The user can then optionally use the UI 404 to review and update the personal information items imported from guest OS modules and/or downloaded from the remote service for correctness and completeness. The importing and/or downloading significantly simplify the user's task of specifying personal information items, especially where the user interacts with multiple websites, uses different user names and passwords for those websites, and want protection for these user names and passwords.

The configurator 406 stores the personal information items in the user data store 414, which may be a database, a repository, one or more files, or the like. In one embodiment, in which different users have access to the guest OS, the personal information items are associated with different users. For example, the personal information items can be grouped by user, or stored in different data stores 414 associated with individual users. In one embodiment, in which the virtualization platform can execute multiple guest OSes, the personal information items can be associated with different guest OSes in the data store(s) 414.

In one embodiment, the UI 404 also allows a user to identify guest applications that can potentially lead to accidental disclosure of the user's personal information. The identifiers of the guest applications can be stored in the data store(s) 414 in association with relevant personal information items.

The input monitor 408 is responsible for monitoring I/O device input data that is being sent to guest OS applications. The I/O device input data is generated by an I/O device 402 that is capable of receiving user input of personal information. The I/O device 402 may be, for example, a keyboard, a cursor control device (e.g., a mouse), a display (e.g., a touchscreen device), etc. In one embodiment, the input monitor 408 constantly monitors I/O device input data while the guest OS is active. In another embodiment, the input monitor 408 monitors I/O device input data only when certain guest OS applications are running and/or these applications are invoked by a specific user.

The match detector 410 is responsible for determining whether the I/O device input data corresponds to any of the personal information items stored in the data store(s) 414. In one embodiment, in which the I/O device is a keyboard, the match detector 410 consecutively checks keystrokes against an initial subset of a personal information item until it finds a contiguous sequence of keystrokes that match the initial subset of the personal information item. For example, if the personal information item is 123456789, the match detector can consecutively check the keystrokes against an initial subset of "1234" until finding a contiguous sequence of keystrokes corresponding to "1234." In one embodiment, the match detector 410 performs the above determination using a sliding window approach. An exemplary embodiment of a method utilizing a sliding window approach will be discussed in more detail in conjunction with FIG. 6.

In one embodiment, the match detector 410 performs additional analysis to mitigate potential false positives of the above operation. For example, the match detector 410 can buffer the identified sequence of keystrokes that matches the initial subset of the personal information item, and then examine the subsequent keystrokes. If the subsequent keystrokes immediately following the identified sequence of keystrokes match the next subset of the personal information item (e.g., "567"), then the initial determination is confirmed. If the subsequent keystrokes do not match the next subset of the personal information item, then the initial result is considered a false positive. An exemplary embodiment of a method for mitigating false positives will be discussed in more detail in conjunction with FIG. 7.

Depending on the determination made by the match detector 410, the transfer manager 412 may or may not decide to transfer the I/O device input to the guest OS. If there was no match between the I/O device input data and any of the personal information items, the transfer manager 412 sends the I/O device input data to the guest OS. Otherwise, if a match was found, the transfer manager 412 may block or delay the transfer. In one embodiment, the transfer manager 412 may alert the user to the disclosure of personal information, as will be discussed in more detail below in conjunction with FIG. 8. In another embodiment, the transfer manager 412 may request the guest OS that the user be alerted to the disclosure of the personal information in the guest OS environment, as will be discussed in more detail below in conjunction with FIG. 9.

Figure 5:
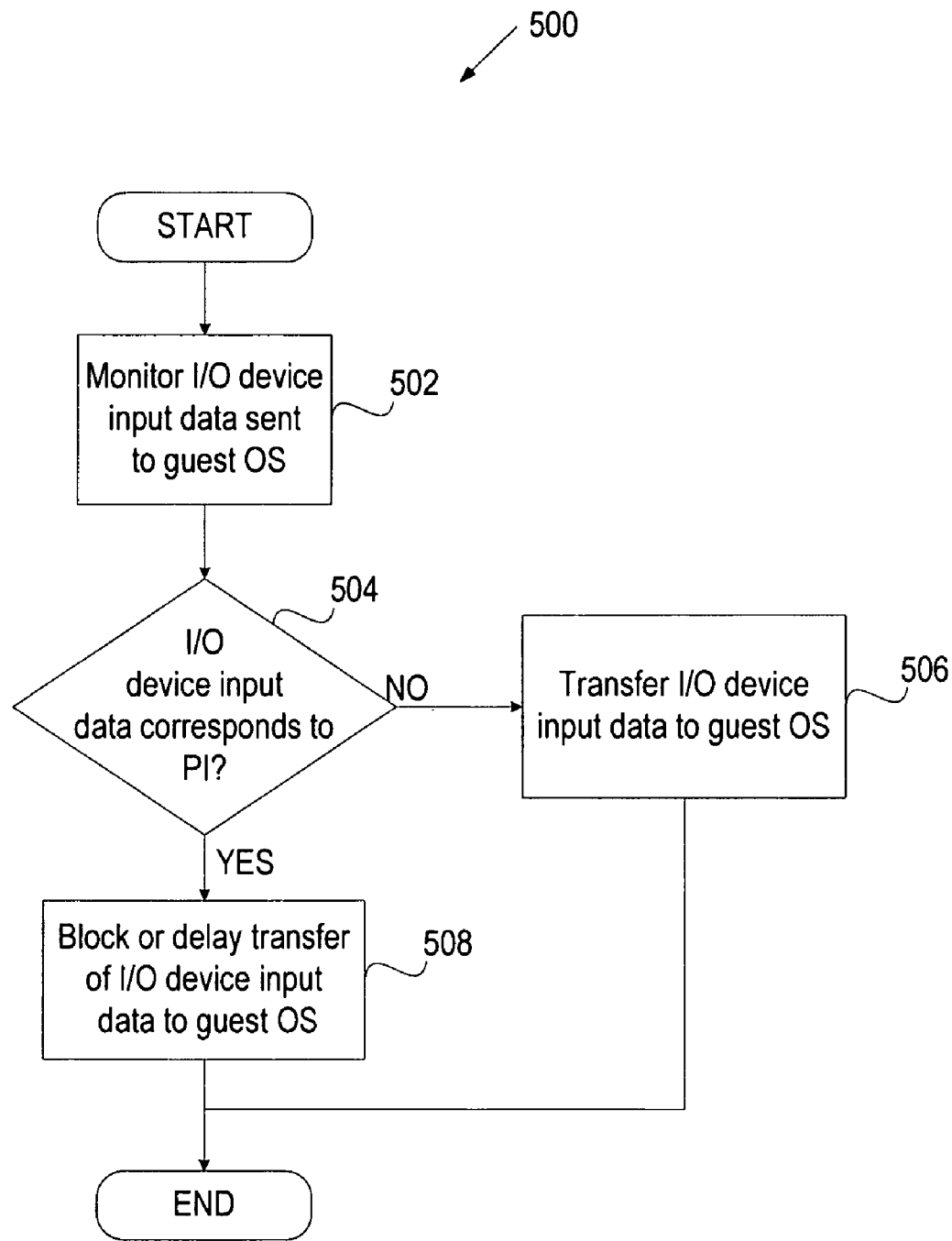
FIG. 5 is a flow diagram of one embodiment of a method for protecting a user from accidentally disclosing personal information in an insecure environment.

FIG. 5 is a flow diagram of one embodiment of a method 500 for protecting a user from accidentally disclosing personal information in an insecure environment. The method 500 is performed by processing logic that may comprise hardware (circuitry, dedicated logic, etc.), software (such as is run on a general purpose computer system or a dedicated machine), or a combination of both. In one embodiment, method 500 is performed by a security agent (e.g., security agent 108 of FIG. 1, a security agent 212 of FIG. 2, or a security agent 310 of FIG. 3).

Referring to FIG. 5, processing logic begins at block 502 with monitoring I/O device input data associated with a guest OS. The I/O device input data may be represented as keystrokes being sent to a guest OS application (e.g., a guest browser).

At block 504, processing logic determines whether the I/O device input data corresponds to any of personal information items stored in a database. If not, processing logic transfers the I/O device input data to the guest OS (block 506). Alternatively, if the I/O device input data corresponds to at least one of the personal information items, processing logic alters the transfer of the I/O device input data to the guest OS (block 508). In particular, processing logic can delay the transfer, block the transfer, perform an additional operation (e.g., generating an alert) along with the transfer, etc.

Figure 6:
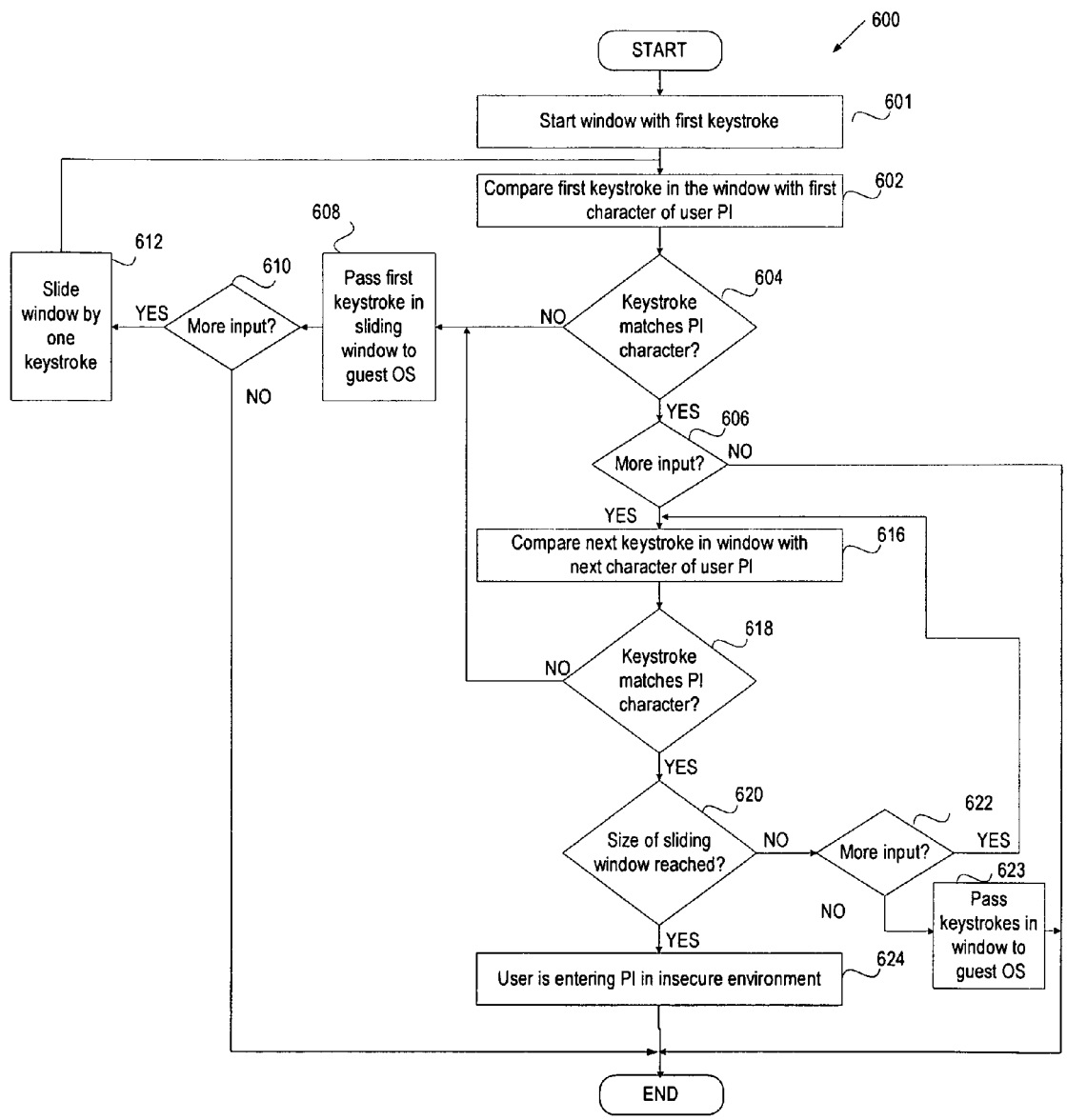
FIG. 6 is a flow diagram of one embodiment of a method for determining whether I/O device input data entered by a user corresponds to personal information of the user.
Figure 7:
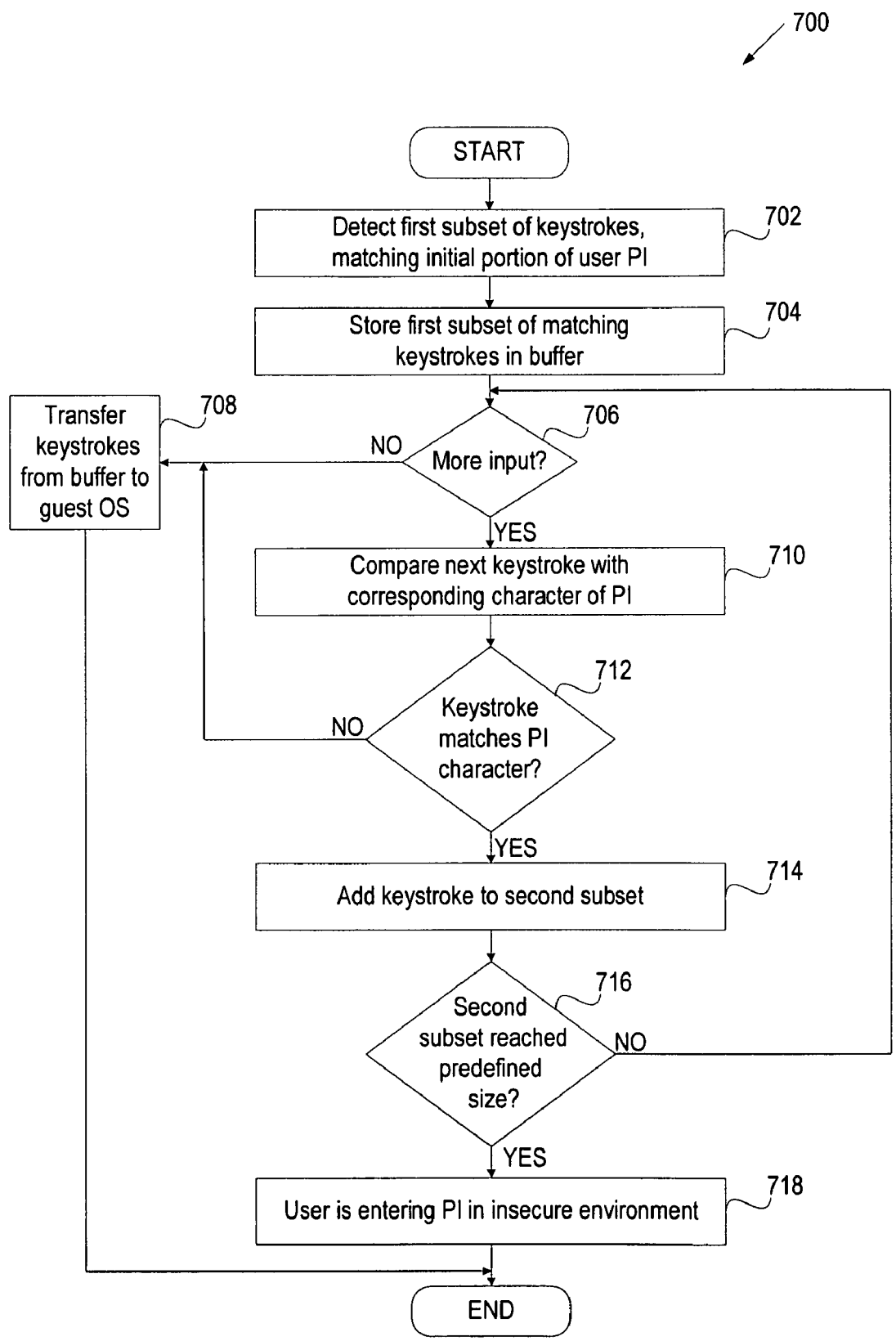
FIG. 7 is a flow diagram of an alternative embodiment of a method for determining whether I/O device input data entered by a user corresponds to personal information of the user.

FIGS. 6 and 7 are flow diagrams of two embodiments of a method 600 for determining whether keystrokes being sent to guest software match personal information of a user. The method is performed by processing logic that may comprise hardware (circuitry, dedicated logic, etc.), software (such as is run on a general purpose computer system or a dedicated machine), or a combination of both. In one embodiment, the method is performed by a security agent (e.g., a security agent 416 of FIG. 4).

Referring to FIG. 6, method 600 begins with processing logic applying a sliding window to data received from the keyboard, beginning with the first keystroke received from the keyboard (block 601). The size of the sliding window may be initialized to a pre-determined number or be configurable by a user (e.g., via a configuration UI 404 of FIG. 4).

At block 602, processing logic compares the first keystroke from the sliding window with the first character of user personal information (e.g., character "1" of SSN "123-45-6789"). If no match is found (block 604), processing logic transfers the first character from the sliding window to the guest OS (block 608), and waits for more input (block 610). If no more input is received, method 600 ends. Otherwise, processing logic slides the window by one keystroke (block 612), and proceeds to block 602.

If the first keystroke matches the first personal information character (e.g., "1") (block 604), processing logic waits for more input (block 606). If no more input is received, method 600 ends. Otherwise, processing logic compares the next keystroke in the window with the next character of the user personal information (e.g., "2") (block 616). If no match is found (block 618), processing logic proceeds to block 608. Otherwise, processing logic checks if the end of the sliding window is reached (block 620). If not, processing logic waits for more input (block 622). If no more input is received, processing logic transfers the processed keystrokes (e.g., "12") from the sliding window to the guest OS (block 623). If a new keystroke is received, processing logic proceeds to block 616.

If the end of the sliding window is reached (e.g., 3 keystrokes "123": in the specific order are identified) (block 624), processing logic decides that the user input in the guest OS (insecure environment) constitutes personal information (block 624).

In some embodiments, in which the size of the sliding window is relatively small, method 600 may generate false positives. Method 700 discussed below in conjunction with FIG. 7 can be performed to mitigate the false positives of method 600.

Referring to FIG. 7, method 700 begins with processing logic detecting a first subset of keystrokes matching the initial portion of the user personal information (e.g., "123") (block 702). At block 704, processing logic stores the first subset of matching keystrokes in a buffer (e.g., in memory, cache, etc.).

Next, if there is no more input entered by the user (block 706), processing logic decides that the subset of characters stored in the buffer constitutes a false positive (block 708). Alternatively, if there is additional input entered by the user, processing logic compares the next entered keystroke with the corresponding character of personal information (e.g., "-" or "4") (block 710). If the next keystroke does not match the corresponding personal information character (block 712), processing logic proceeds to block 708. Otherwise, if the keystroke does match the corresponding personal information character, processing logic adds the keystroke to the second subset (block 714), and determines whether the second subset of keystrokes has reached a predefined size (e.g., size of 4) (block 716). If not, processing logic proceeds to block 706. If so (e.g., if second subset is "-45-" or "4567"), processing logic decides that the user input in the guest OS constitutes personal information (block 718).

Figure 8:
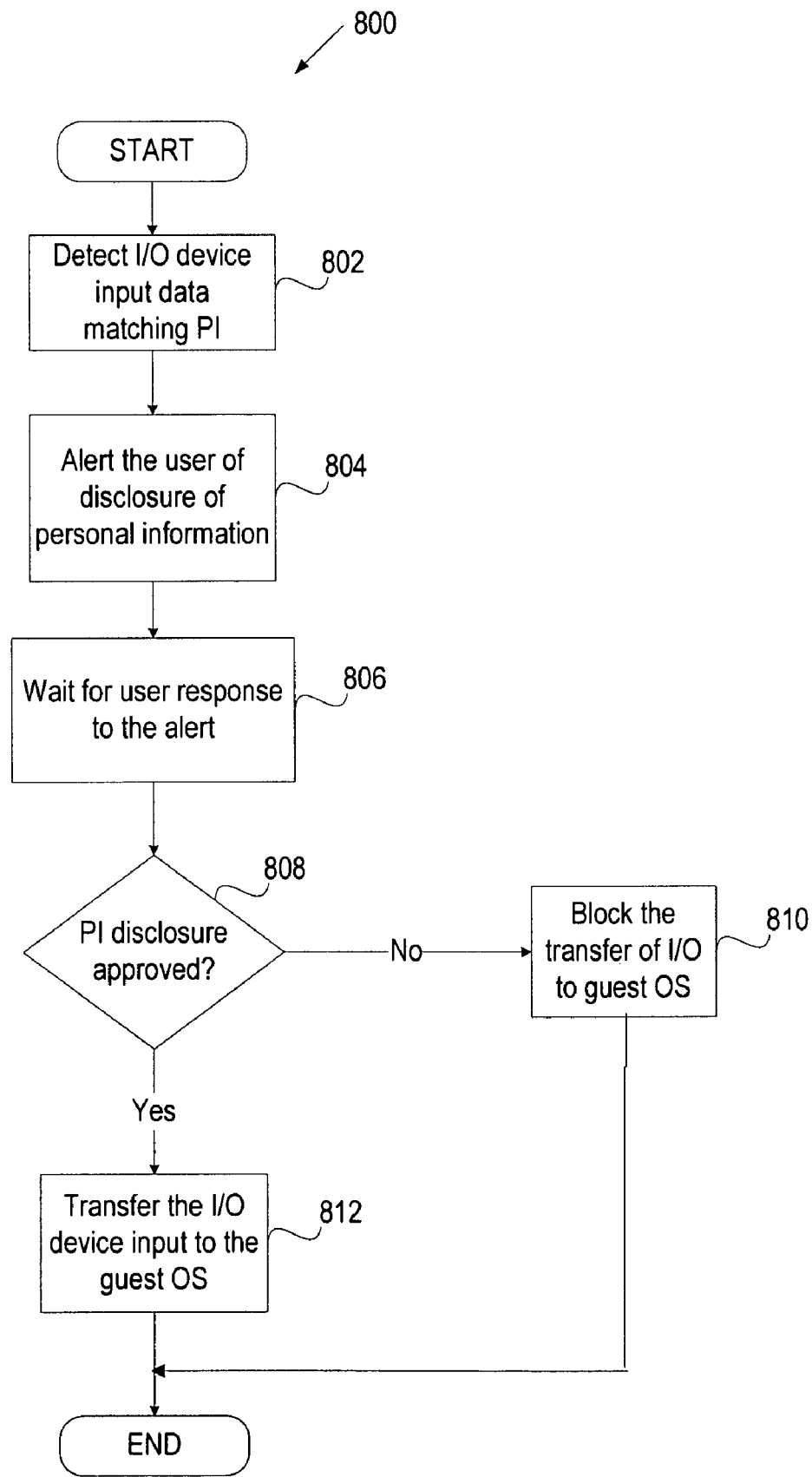
FIG. 8 is a flow diagram of one embodiment of a method for notifying a user regarding potential disclosure of personal information in an insecure environment.

FIG. 8 is a flow diagram of one embodiment of a method 800 for notifying a user regarding potential disclosure of personal information in an insecure environment. The method 800 is performed by processing logic that may comprise hardware (circuitry, dedicated logic, etc.), software (such as is run on a general purpose computer system or a dedicated machine), or a combination of both. In one embodiment, the method 800 is performed by a security agent of a privileged OS (e.g., security agent 416 of FIG. 4).

Referring to FIG. 8, processing logic begins with detecting I/O device input data that corresponds to personal information of a user (block 802). At block 804, processing logic alerts the user of the disclosure of the personal information in an insecure environment. The alert may be presented, for example, via a UI overlay window in the privileged OS environment, requesting a user response to the alert. Processing logic waits for the response from the user (block 806). If the user response indicates that the user approves the disclosure of personal information in the guest OS (block 808), processing logic transfers the I/O device input data to the guest OS and allows the task to be continued in the guest OS (block 812). If the user response indicates that the user disclosed personal information in the guest OS accidentally, processing logic blocks the transfer of the I/O device input data to the guest OS (block 810).

Figure 9:
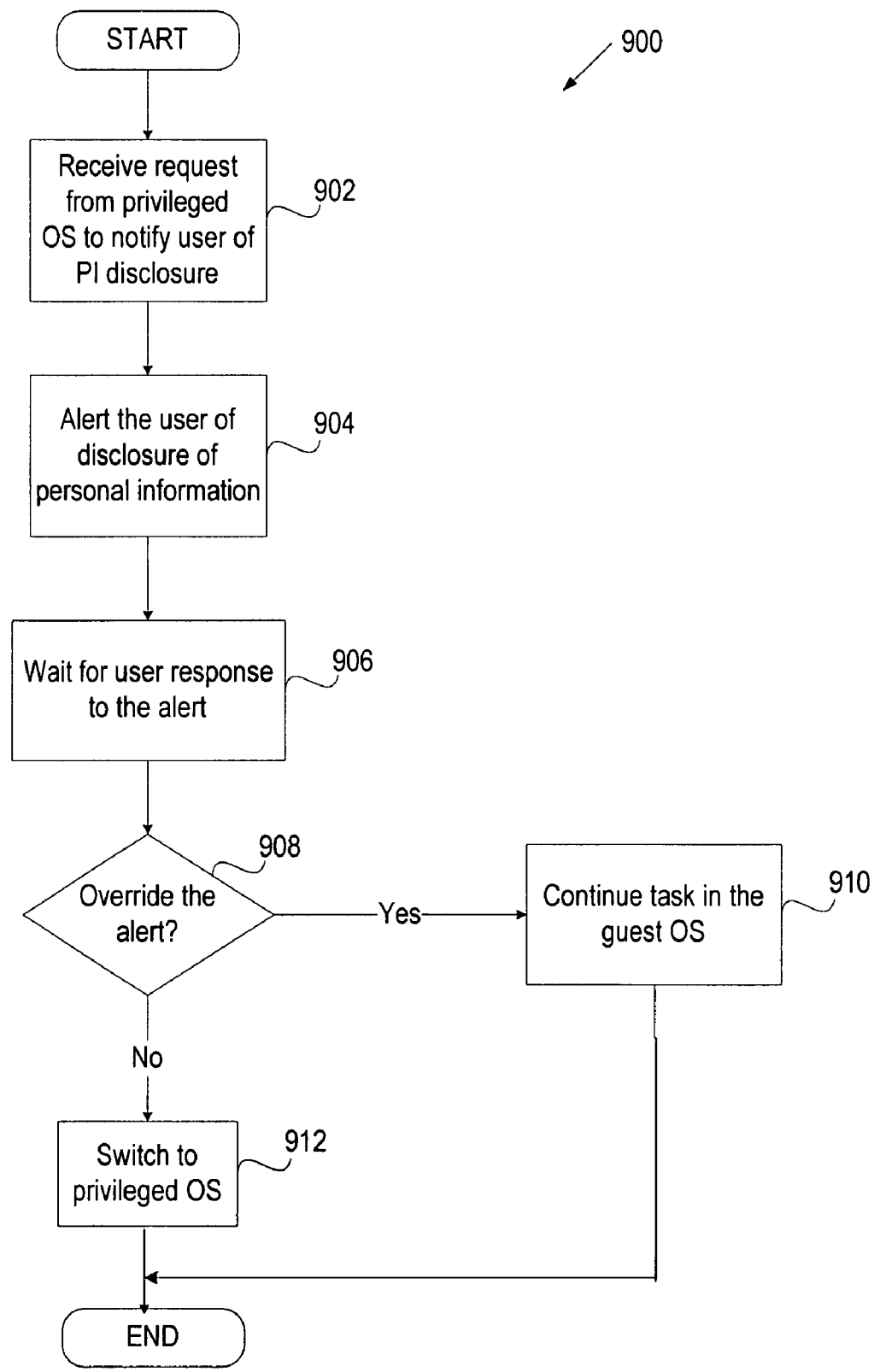
FIG. 9 is a flow diagram of another embodiment of a method for notifying a user regarding potential disclosure of personal information in an insecure environment.

FIG. 9 is a flow diagram of another embodiment of a method 900 for notifying a user regarding potential disclosure of personal information in an insecure environment. The method 900 is performed by processing logic that may comprise hardware (circuitry, dedicated logic, etc.), software (such as is run on a general purpose computer system or a dedicated machine), or a combination of both. In one embodiment, the method 900 is performed by a security agent of a guest OS. (e.g., guest security agent 104 of FIG. 1, guest security agent 206 of FIG. 2, or guest security agent 308 of FIG. 3).

Referring to FIG. 9, processing logic begins with receiving a request from a security agent of a privileged OS to notify the user of personal information disclosure in the guest OS (block 902). Processing logic responds to the request by alerting the user of the personal information disclosure in the guest OS (block 904). Processing logic may present the alert via a UI overlay window asking the user for a response to the alert.

Next, processing logic waits for the response from the user (block 906). If the user overrides the alert indicating that he or she approves the disclosure of personal information in the guest OS (block 908), processing logic continues the task in the guest OS (block 910). Otherwise, if the user response indicates that the user disapproves the disclosure of personal information in the guest OS, processing logic allows the user to switch to the privileged OS (block 912), where the user may continue or restart the task.

Figure 10:
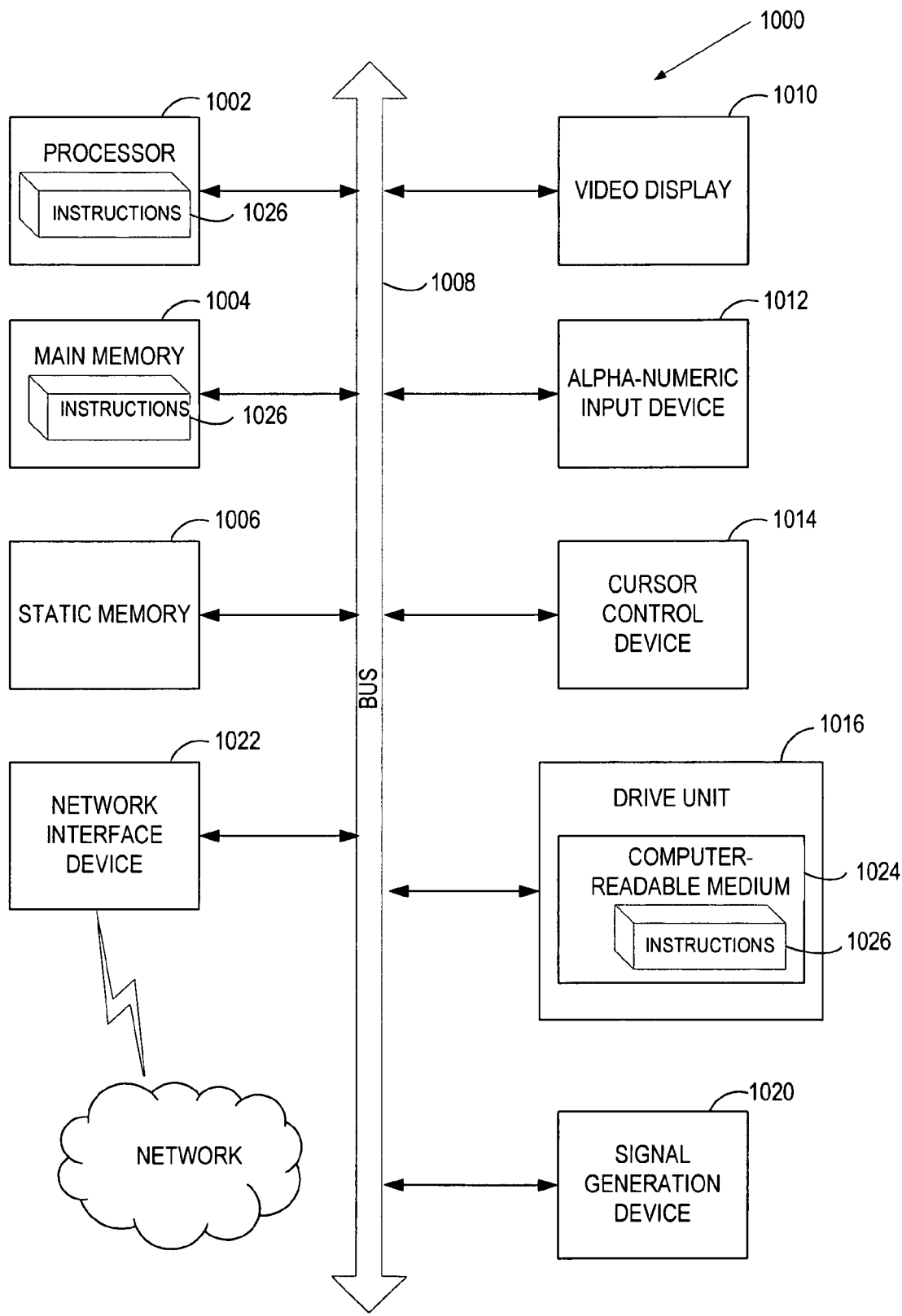
FIG. 10 is a block diagram of an exemplary computer system that may perform one or more of the operations described herein.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute the processing logic 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-accessible storage medium 1030 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-accessible storage media. The software 1022 may further be transmitted or received over a network 1020 via the network interface device 1008.

While the machine-accessible storage medium 1030 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A computer-implemented method comprising:
    monitoring, by a security agent of a privileged operating system (OS) running on a privileged virtual machine (VM) hosted by a computing device, data inputted by a user to a guest VM of a plurality of guest VMs having a plurality of guest OSes, the data inputted by the user with an I/O device that is associated with a guest OS of the plurality of guest OSes and that the privileged OS has control over, wherein the privileged OS executes at a privilege level higher than that of the plurality of guest OSes;
    determining, by the security agent of the privileged OS, whether the data inputted using the I/O device corresponds to at least one personal information item of the user stored with the privileged OS, the determining comprising comparing a sequence of elements of the data inputted against a subset of the personal information item;
    when the sequence of the elements of the data inputted matches the subset of the personal information item:
        sending, by the security agent of the privileged OS, an alert to inform the user of the guest VM of disclosure of the personal information item; and
        at least one of blocking or delaying, by the security agent of the privileged OS, a transfer of the data inputted to the guest OS if the data inputted corresponds to the personal information; and
    when the sequence of the elements of the data inputted does not match the subset of the personal information item, repeating the determining on a subsequent sequence of the elements of the data inputted.

2. The method of claim 1, wherein the I/O device comprises any one of a keyboard, a cursor control device, and a display device.

3. The method of claim 1, wherein the privileged OS comprises any one of a hypervisor, a virtual machine monitor (VMM), a host OS, a protected OS, a management OS and a service OS.

4. The method of claim 1, wherein the personal information comprises one or more of an account user name, an account password, a credit card number, a social security number, an account number, an employee number, a customer or patient number, a driver license number, and a license plate number.

5. The method of claim 1, wherein further comprising, when the sequence of the elements of the data inputted matches the subset of the personal information item:
    buffering the matching sequence of elements of the data inputted;
    determining whether a sequence of elements immediately following the matching sequence corresponds to a subsequent subset of the personal information; and
    determining that the matching contiguous sequence of I/O device input elements is a false positive when the sequence of elements immediately following the matching sequence does not correspond to the subsequent subset of the personal information.

6. The method of claim 1, wherein delaying the transfer comprises:
    receiving, from the user of the monitored VM, a user response to the alert;
    transferring the data inputted to the guest OS when the user response indicates an approval of the transfer of the personal information to the guest OS; and
    blocking the transfer of the data inputted to the guest OS when the user response indicates a disapproval of the transfer of the personal information to the guest OS.

7. The method of claim 1, further comprising:
    creating a list of personal information items based on data provided by the user or data imported from a password manager or a form filler component of the guest OS; and
    storing the list of personal information items in a database.

8. The method of claim 7, wherein the personal information items are associated with a plurality of users.

9. The method of claim 7, further comprising:
    receiving user input identifying guest OS applications for which the data inputted is to be monitored; and
    storing identifiers of the guest OS applications in the database.

10. The method of claim 1, further comprising:
    requesting, by the security agent of the privileged OS, the security agent of the guest OS to alert the user of the disclosure of the personal information.

11. The method of claim 10, wherein the security agent of the guest OS responds to the request by:
    notifying the user of the disclosure of the personal information, and
    allowing the user to at least one of override the alert and continue interaction with the guest OS, or switch to the privileged OS.

12. A system comprising:
    a memory;
    a processing device communicably coupled to the memory;
    a privileged VM of a plurality of VMs virtualizing the memory and the processing device, the privileged VM comprising a privileged OS that executes at a privilege level higher than privilege levels of a plurality of guest operating systems (OSes) that are each associated with a remainder of the plurality of VMs; and a security agent of the privileged OS, the security agent configured to, for each VM of the plurality of VMs:

monitor data inputted by a user of a guest VM of the plurality of VMs, the data inputted by the user with an I/O device that is associated with a guest OS of the plurality of guest OSes that is associated with the guest VM, wherein the privileged OS having control over the I/O device;

determine whether the data inputted using the I/O device corresponds to at least one personal information item of the user, the determining comprising comparing a sequence of elements of the data inputted against a subset of the personal information item;

when the sequence of the elements of the data inputted matches the subset of the personal information item:

send, by the security agent of the privileged OS, an alert to inform the user of the guest VM of disclosure of the personal information item; and at least one of block or delay, by the security agent of the privileged OS, a transfer of the data inputted to the guest OS if the data inputted corresponds to the personal information; and when the sequence of the elements of the data inputted does not match the subset of the personal information item, repeat the determining on a subsequent sequence of the elements of the data inputted.

13. The system of claim 12, wherein the security agent of the privileged VM comprises a transfer manager configured to:

receive, from the user of the monitored VM, a user response to the alert;

transfer the data inputted to the guest OS when the user response indicates an approval of the transfer of the personal information to the guest OS; and block the transfer of the data inputted to the guest OS when the user response indicates a disapproval of the transfer of the personal information to the guest OS.

14. The system of claim 12, wherein the security agent of the guest OS is configured to:

receive, from the security agent of the privileged OS, the alert to inform the user of the disclosure of the personal information in the guest OS;

notify the user of the disclosure of the personal information in the guest OS; and allow the user to override the alert and continue interaction with the guest OS, or to switch to the privileged OS.

15. The system of claim 12, wherein the security agent further configured to, when the sequence of the elements of the data inputted matches the subset of the personal information item:

buffering the matching sequence of elements of the data inputted;

determining whether a sequence of elements immediately following the matching sequence corresponds to a subsequent subset of the personal information; and determining that the matching contiguous sequence of I/O device input elements is a false positive when the sequence of elements immediately following the matching sequence does not correspond to the subsequent subset of the personal information.

16. The system of claim 12, wherein the security agent further configured to request a security agent of the guest OS to alert the user of the disclosure of the personal information.

17. A non-transitory computer readable storage medium that provides instructions, which when executed on a processing system, cause the processing system to perform operations comprising:

monitoring, by a security agent of a privileged operating system (OS) running on a privileged virtual machine (VM) hosted by a computing device, data inputted by a user to a guest VM of a plurality of guest VMs having a plurality of guest OSes, the data inputted by the user with an I/O device that is associated with a guest OS of the plurality of guest OSes and that the privileged OS has control over, wherein the privileged OS executes at a privilege level higher than that of the plurality of guest OSes;

determining, by the security agent of the privileged OS, whether the data inputted using the I/O device corresponds to at least one personal information item of the user stored with the privileged OS, the determining comprising comparing a sequence of elements of the data inputted against a subset of the personal information item;

when the sequence of the elements of the data inputted matches the subset of the personal information item:

sending, by the security agent of the privileged OS, an alert to inform the user of the guest VM of disclosure of the personal information; and at least one of blocking or delaying, by the security agent of the privileged OS, a transfer of the data inputted to the guest OS if the data inputted corresponds to the personal information item; and when the sequence of the elements of the data inputted does not match the subset of the personal information item, repeating the determining on a subsequent sequence of the elements of the data inputted.

18. The non-transitory computer readable storage medium of claim 17, wherein the I/O device comprises any one of a keyboard, a cursor control device, and a display device.

19. The non-transitory computer readable storage medium of claim 17, wherein delaying the transfer comprises:

receiving, from the user of the monitored VM, a user response to the alert;

transferring the data inputted to the guest OS when the user response indicates an approval of the transfer of the personal information to the guest OS; and blocking the transfer of the data inputted to the guest OS when the user response indicates a disapproval of the transfer of the personal information to the guest OS.

20. The non-transitory computer readable storage medium of claim 17, wherein the instructions, when executed on the processing system, cause the processing system to perform further operations comprising:

buffering the matching sequence of elements of the data inputted;

determining whether a sequence of elements immediately following the matching sequence corresponds to a subsequent subset of the personal information; and determining that the matching contiguous sequence of I/O device input elements is a false positive when the sequence of elements immediately following the matching sequence does not correspond to the subsequent subset of the personal information.

* * * * *